United States Patent
Dunagan et al.

(10) Patent No.: US 8,214,236 B2
(45) Date of Patent: Jul. 3, 2012

(54) DEVELOPING AND SUSTAINING CAPABILITIES OF A BUSINESS

(75) Inventors: Deborah Louise Dunagan, Gainesville, GA (US); Cheryl Diane Jetmund, West Tisbury, MA (US); Louisa Josephine Peluso, Atlanta, GA (US); Gloria M. Ron-Fornes, Summit, NJ (US)

(73) Assignee: International Business Machines Corporation, Armonk, NY (US)

( * ) Notice: Subject to any disclaimer, the term of this patent is extended or adjusted under 35 U.S.C. 154(b) by 1063 days.

(21) Appl. No.: 11/501,636

(22) Filed: Aug. 8, 2006

(65) Prior Publication Data
US 2008/0052246 A1    Feb. 28, 2008

(51) Int. Cl.
*G06F 17/60* (2006.01)
(52) U.S. Cl. ..................... 705/7.11; 705/7.14
(58) Field of Classification Search ............ 705/1, 7, 705/10, 7.11, 7.14
See application file for complete search history.

(56) References Cited

U.S. PATENT DOCUMENTS

| | | | |
|---|---|---|---|
| 5,745,878 A * | 4/1998 | Hashimoto et al. | 705/1 |
| 6,363,393 B1 * | 3/2002 | Ribitzky | 707/102 |
| 6,601,233 B1 * | 7/2003 | Underwood | 717/102 |
| 7,035,809 B2 * | 4/2006 | Miller et al. | 705/8 |
| 2002/0194053 A1 * | 12/2002 | Barrett et al. | 705/10 |
| 2003/0135399 A1 * | 7/2003 | Ahamparam et al. | 705/7 |
| 2004/0054545 A1 * | 3/2004 | Knight | 705/1 |
| 2004/0093244 A1 * | 5/2004 | Hatcher et al. | 705/7 |
| 2004/0138933 A1 * | 7/2004 | LaComb et al. | 705/7 |
| 2005/0138070 A1 * | 6/2005 | Huberman et al. | 707/104.1 |
| 2005/0203784 A1 * | 9/2005 | Rackham | 705/7 |
| 2005/0222881 A1 * | 10/2005 | Booker | 705/7 |
| 2007/0265899 A1 * | 11/2007 | Angier et al. | 705/8 |
| 2008/0046726 A1 * | 2/2008 | Dunagan et al. | 713/167 |
| 2008/0052246 A1 * | 2/2008 | Dunagan et al. | 705/80 |

OTHER PUBLICATIONS

Veryard, Richard, "Component-Based Business", Springer-Verlog, London 2001.
Gongla & Rizzuto, "Evolving Communities of Practice: IBM Global Services Experience", IBM Systems Journal, vol. 40, No. 4, 2001, pp. 842-862.
Lesser & Prusak, "Communities of Practice, Social Capital and Organizational Knowledge", IBM Institute for Knowledge Management, Aug. 1999.
Pohle et al, "Component Business Models", IBM Institute for Business Value publication, Jun. 2, 2005 from www.ibm.com/bcs.
Etienne Wenger, "Communities of Practice—A Brief Introduction", from www.ewenger.com/theory/index.htm.
Wojtek Kozaczynski, "Architecture Framework for Business Components", IEEE 1085-9098/98, 1998, pp. 300-307.
William M. Snyder, "Communities of Practice: Combining Organizational Learning and Strategy Insights to Create a Bridge to the 21st Century", Aug. 1997, www.co-i-l-com. Wenger, Etienne et al, "Cultivating Communities of Practice", Harvard Business School Press, 2002, chapter I. p.p. 1-21, and chapter 8 pp. 161-185.

* cited by examiner

*Primary Examiner* — Beth V Boswell
*Assistant Examiner* — Ernest A Jackson
(74) *Attorney, Agent, or Firm* — John R. Pivnichny; Ronald A. D'Alessandro; Keohane & D'Alessandro PLLC

(57) ABSTRACT

A business wishes to improve its capabilities by developing and sustaining its communities of practice. A business model is provided having components and attributes for various levels of each component. The community is assessed based on the attributes. A community development roadmap is developed of activities for improving the level of the community. Funding is negotiated to carry out the activities, and the community is subsequently reassessed.

16 Claims, 2 Drawing Sheets

DEVELOPING AND SUSTAINING CAPABILITIES OF A BUSINESS

RELATED APPLICATIONS

This application is related to patent application Ser. No. 11/501,660 filed on Aug. 8, 2006 entitled ASSESSING A COMMUNITY OF PRACTICE CAPABILITY.

TECHNICAL FIELD

The invention relates to developing and sustaining certain capabilities of a business organization. More particularly, the invention relates to the use of a community of individuals to provide these capabilities, and methods for improving this capability for the betterment of the business.

BACKGROUND OF THE INVENTION

Businesses, particularly those in the knowledge industries have developed a great interest in forming and fostering communities of practice within their organizations as a means of providing a high quality way of getting the work of the company done. Communities of practice provide an effective way of managing organizational knowledge. This phenomenon has been described by Wenger, McDermott, and Snyder in their book, *Cultivating Communities of Practice*, chapter 1, pages 1-21.

Lesser and Prusak also describe this use of communities of practice in their paper, "Communities of Practice, Social Capital and Organizational Knowledge." They note that organizations have a formal structure often described by an organization chart. But, there are also informal networks of employees, crossing organizational boundaries, who work together to create, share, and apply organizational knowledge.

As used herein, the term community of practice shall be taken to mean as in Lesser and Prusak paper, a collection of individuals bound by informal relationships that share similar work roles and a common context.

Gongla and Rizzuto describe their experience with such communities of practice within a large organization in their paper titled, "Evolving Communities of Practice: IBM Global Services Experience."

The articles by Gongla and Lesser, as well as pages 1-21 of the book by Wenger, shall be incorporated herein by reference.

With such great interest by business organizations, naturally there is a desire to improve the business' capabilities by using improved methods of developing and sustaining the capabilities of their respective communities of practice. An important element of improved methods in developing and sustaining communities lies in improved methods of measuring or assessing the current capabilities of an existing community. Such an improved measuring method is the subject of the related patent application identified above which shall be incorporated herein by reference. The object of the present invention is directed to methods of improving these capabilities while making use of such improved measurement methods.

OBJECTS AND SUMMARY OF THE INVENTION

It is therefore a principal object of the present invention to enhance the business capability arts by providing a method of improvement thereto.

It is a further object to provide such a method which can be applied to a business in a relatively inexpensive and facile manner.

These and other objects are attained in accordance with one embodiment of the present invention wherein there is provided a method of developing and sustaining capabilities of a business, comprising the steps of, providing a business model for the business having components with defined attributes for a plurality of levels of capability, wherein the components include sponsorship, funding, roles and responsibilities, measurements, incentives, technology, activities and processes, strategy and vision and value proposition, tacit knowledge and expertise, and member value, forming a community of individuals of the business; assessing, based on the attributes, the level of capability for the community in each of the components, setting goals and action plans for managing and improving the community in its level of capability in performance of the components, negotiating the appropriate amount of funding to carry out the action plans, and subsequently reassessing the level of the community in each of the components.

BEST MODE FOR CARRYING OUT THE INVENTION

In a better understanding of the present invention, together with other and further objects, advantages and capabilities thereof, reference is made to the following disclosure and the appended claims in connection with the above-described drawings.

Figure 1:
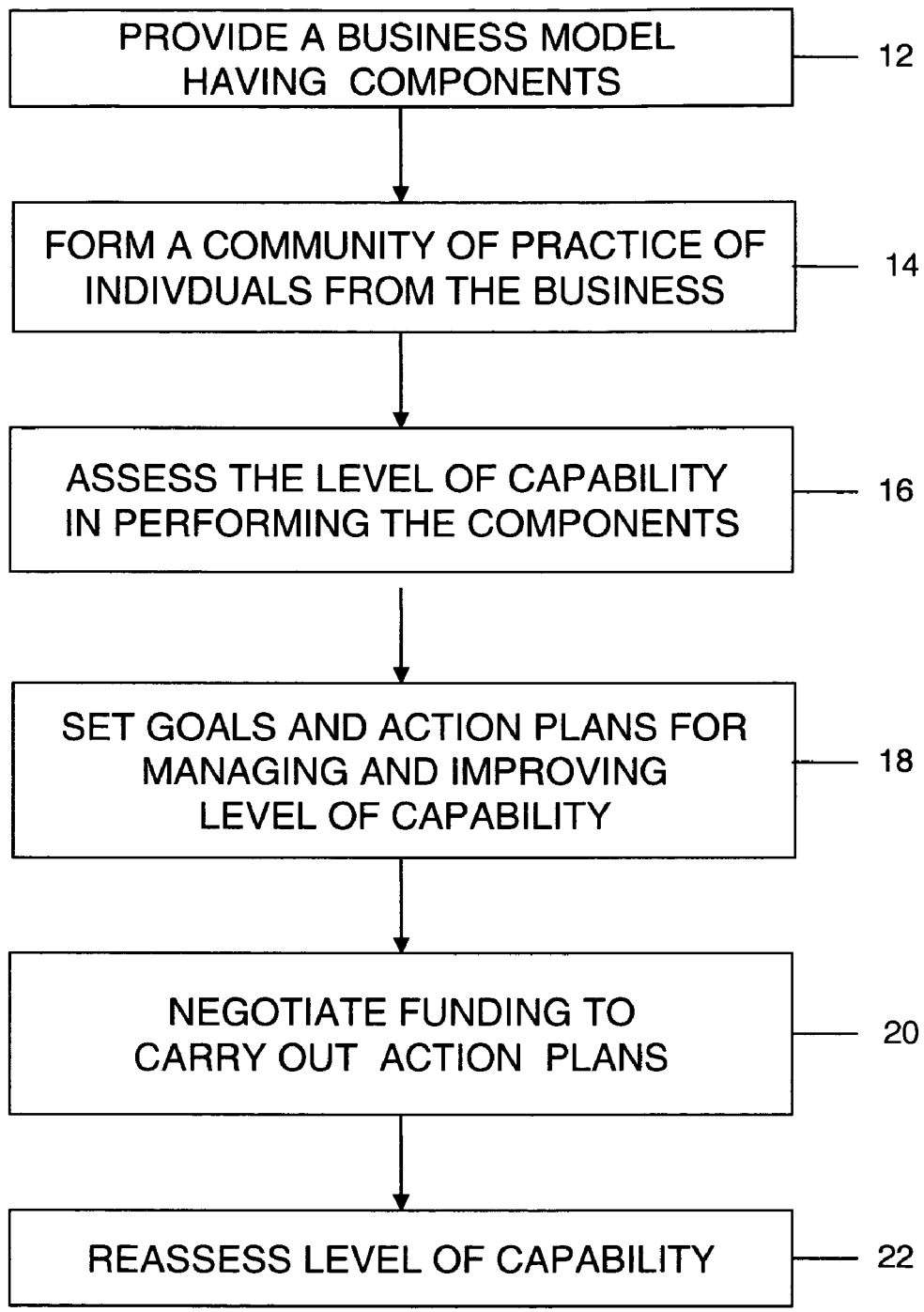
FIG. 1 is a flowchart depicting steps of one embodiment of the present invention.

FIG. 1 shows the steps of a method of developing and sustaining capabilities of a business in accordance with one embodiment of the present invention. In step 12, a business model is provided for the business. The model has components with defined attributes for a plurality of levels of capability as described more fully in the related patent application listed above. In particular, the components include sponsorship, funding, roles and responsibilities, measurements, incentives, technology, activities and processes, strategy and vision and value proposition, tacit knowledge and expertise, and member value.

In step 14, a community of practice is formed of individuals from the business. The individuals would preferably be employees of the business, which may be any type of business, but is more likely to be a knowledge industry type of business with employees who are knowledge workers. Although step 14 is shown in FIG. 1 to follow step 12, this is not necessary and the steps of FIG. 1 may be performed in any order when this is possible. In the case of steps 12 and 14, either may be performed first or they may be performed in substantially the same time duration.

In step 16, which logically must follow steps 12 and 14, the level of capability of the community is assessed using the attributes in the business model to score a current level for each component in the model and optionally an overall community score using the methods described in the related patent application.

In step 18, goals and action plans are set for managing and improving the community level of capability for each of the components. Because the overall community score is formed by combining the current levels of the components, it would normally also improve. However, the overall score improvement may be large or small depending on the method of combining the current levels of the components. In unusual circumstances, it is even possible for the overall score to decrease if the levels of some components improve and while others decrease.

Setting of goals and action plans may involve developing a community development roadmap. The roadmap specifies an ordering, sequencing, and timing of activities for the improvement in level of capability of the community for the components as described above.

The roadmap may be developed through collaboration with a sponsor from the sponsorship component, leaders of the community, or a team put together to perform the assessment of step 16. It is even possible in some cases for the roadmap to be developed prior to formation of the community in step 14 or the assessment thereof in step 16.

In step 20, an appropriate amount of funding is negotiated to carry out the action plans set in step 18. The type of negotiation will depend, of course, on the structure and financial processes, which apply in the specific business desiring to develop and sustain its capabilities. After receiving the funding, the action plans are carried out, also in step 20.

In step 22, at some time later, the level of capability of the community in each of the components and optionally the overall community capability is re-assessed.

Figure 2:
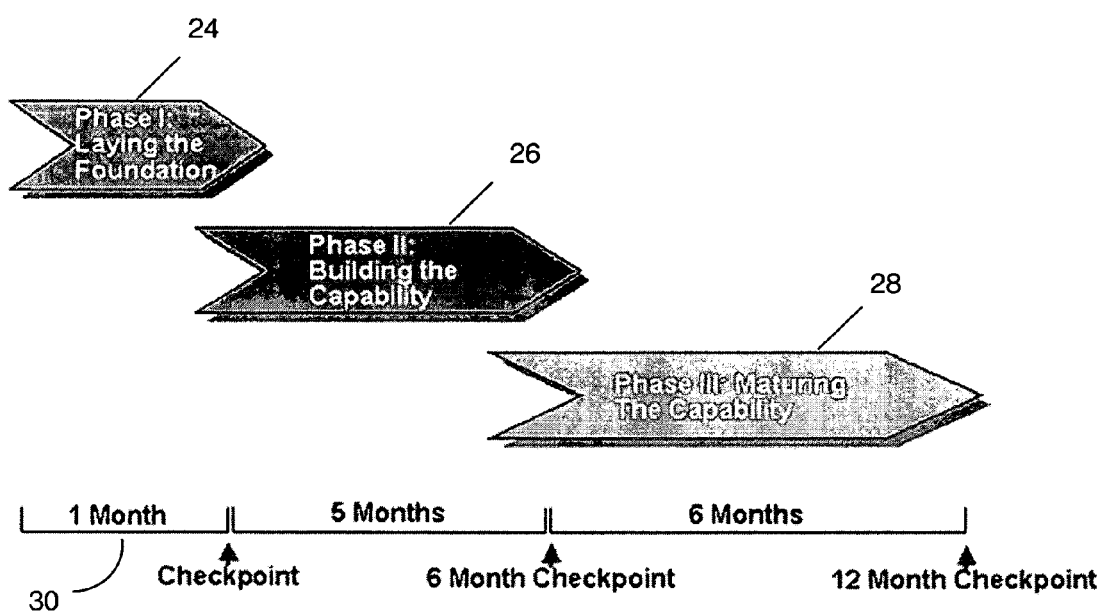
FIG. 2 is a phase diagram of a community development roadmap in accordance with the present invention.

FIG. 2, is a phase diagram showing an organization of activities from the community development roadmap into three phases of laying the foundation 24, building the capability 26, and maturing the capability 28. The phases may overlap as shown. A series of checkpoints 30 at specified time intervals may be part of the phase diagram. The phase diagram is keyed to action plan activities, which may be directed at improving one or more component levels. Consequently, a number of phase diagrams may be needed, but not necessarily a separate phase diagram for each component.

While there have been shown and described what are at present considered the preferred embodiments of the invention, it will be obvious to those skilled in the art that various changes and modifications may be made therein without departing from the scope of the invention as defined by the appended claims.

What is claimed is:

1. A method of developing and sustaining capabilities of a business, the method comprising:
providing, using at least one computing device, components of a business model with defined attributes for a plurality of levels of capability, wherein the components include the capabilities of offering and managing sponsorship, funding, roles and responsibilities, measurements, incentives, technology, activities and processes, strategy and vision and value proposition, tacit knowledge and expertise, and member value;
forming, using at least one computing device, a community of individuals of the business;
assessing, using at least one computing device, and based on the defined attributes, the level of capability for the community in each of the components;
setting, using at least one computing device, goals and action plans for managing and improving the community in its level of capability in performance of the components, wherein the goals and actions plans are developed based on a community development roadmap, which specifies the ordering, sequencing, and timing of activities as a series of checkpoints at pre-specified time intervals for improving or sustaining the community in its level of capability;
negotiating, using at least one computing device, the appropriate amount of funding to carry out the action plans; and
reassessing, using at least one computing device, the level of capability of the community in each of the components.

2. The method of claim 1, further comprising assessing, using at least one computing device, by an assessment team.

3. The method of claim 2 further comprising collaborating, using at least one computing device, on the community development roadmap with a sponsor, leaders of the community and an assessment team.

4. The method of claim 2 further comprising developing, using at least one computing device, the community development roadmap prior to forming the community of individuals.

5. The method of claim 2 further comprising organizing, using at least one computing device, and by the community development roadmap, the activities into phases of laying the foundation, building the capability, and maturing the capability.

6. A system operating with at least one computing device programmed for developing and sustaining capabilities of a business, the system comprising:
components with defined attributes for a plurality of levels of capability, wherein the components include sponsorship, funding, roles and responsibilities, measurements, incentives, technology, activities and processes, strategy and vision and value proposition, tacit knowledge and expertise, and member value;
a computing device for forming a community of individuals of the business;
wherein, based on the attributes, a level of capability for the community in each of the components is assessed;
goals and action plans for managing and improving the community in its level of capability in performance of the components, wherein the goals and actions plans are developed based on a community development roadmap, which specifies the ordering, sequencing, and timing of activities as a series of checkpoints at pre-specified time intervals for improving or sustaining the community in its level of capability;
wherein the appropriate amount of funding to carry out the action plans is negotiated; and
wherein the level of the community in each of the components is reassessed.

7. The system of claim 6 wherein the level of the community in each of the components is reassessed by a reassessment committee.

8. The system of claim 6 further comprising a collaboration of a sponsor, leaders of the community and an assessment team.

9. The system of claim 6, wherein the community development roadmap is developed prior to the forming of the community of individuals.

10. The system of claim 6, wherein the community development roadmap organizes the activities into phases of laying the foundation, building the capability, and maturing the capability.

11. A method of developing and sustaining capabilities of a business, the method comprising:
providing, using at least one computing device, components with defined attributes for a plurality of levels of capability, wherein the components include capabilities of offering and managing sponsorship, funding, roles and responsibilities, measurements, incentives, technology, activities and processes, strategy and vision and value proposition, tacit knowledge and expertise, and member value;

forming, using at least one computing device, a community of individuals of the business;

assessing, using at least one computing device, and based on the defined attributes, the level of capability for the community in each of the components;

setting goals and action plans for managing and improving the community in its the level of capability in performance of the components, wherein the goals and actions plans are developed based on a community development roadmap, which specifies the ordering, sequencing, and timing of activities as a series of checkpoints at pre-specified time intervals for improving or sustaining the community in its level of capability;

negotiating, using at least one computing device, the appropriate amount of funding to carry out the action plans; and reassessing, using at least one computing device, the level of capability of the community in each of the components.

12. The method of claim 11, wherein the reassessing is performed, using at least one computing device, by a reassessment committee.

13. The method of claim 11 further comprising enabling, using at least one computing device, collaboration of a sponsor, leaders of the community and an assessment team.

14. A computer program product stored in a computer readable medium for operating in a system comprising at least one CPU and memory for implementing a method for developing and sustaining capabilities of a business, said computer program product comprising instructions for performing the following steps:

providing components with defined attributes for a plurality of levels of capability, wherein the components include sponsorship, funding, roles and responsibilities, measurements, incentives, technology, activities and processes, strategy and vision and value proposition, tacit knowledge and expertise, and member value;

forming a community of individuals of the business;

assessing, based on the attributes, a level of capability for the community in each of the components;

setting goals and action plans for managing and improving the community in its level of capability in performance of the components, wherein the goals and actions plans are developed based on a community development roadmap, which specifies the ordering, sequencing, and timing of activities as a series of checkpoints at pre-specified time intervals for improving or sustaining the community in its level of capability, and wherein the community development roadmap is developed prior to forming the community of individuals;

negotiating the appropriate amount of funding to carry out the action plans; and reassessing the level of the community in each of the components.

15. The computer program product of claim 14 wherein the method further comprises reassessing by a reassessment committee.

16. The computer program product of claim 14 wherein the method further comprises enabling the collaboration a sponsor, leaders of the community and an assessment team.

* * * * *